United States Patent
Beaury et al.

(10) Patent No.: US 8,520,705 B2
(45) Date of Patent: Aug. 27, 2013

(54) DEVICE AND METHOD FOR SERIAL DATA TRANSMISSION BETWEEN A POSITION-MEASURING DEVICE AND A CONTROL UNIT

(75) Inventors: Bernhard Beaury, Rimsting (DE); Heik H. Hellmich, Kienberg (DE); Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 103 days.

(21) Appl. No.: 12/996,681

(22) PCT Filed: Mar. 25, 2009

(86) PCT No.: PCT/EP2009/053494
§ 371 (c)(1),
(2), (4) Date: Dec. 7, 2010

(87) PCT Pub. No.: WO2009/149966
PCT Pub. Date: Dec. 17, 2009

(65) Prior Publication Data
US 2011/0116501 A1    May 19, 2011

(30) Foreign Application Priority Data
Jun. 11, 2008   (DE) .......................... 10 2008 027 902

(51) Int. Cl.
*H04J 3/06* (2006.01)
*H04L 12/28* (2006.01)
*H04L 12/56* (2006.01)

(52) U.S. Cl.
USPC ............................ 370/503; 370/392; 370/419

(58) Field of Classification Search
USPC ................................. 370/419, 503, 389, 392
See application file for complete search history.

(56) References Cited

U.S. PATENT DOCUMENTS 3,309,463 A    3/1967  Roedl
6,640,308 B1   10/2003 Keyghobad et al.
(Continued)

FOREIGN PATENT DOCUMENTS

| EP | 0 171 579 | 2/1986 |
| EP | 0 660 209 | 6/1995 |
| EP | 1 369 754 | 12/2003 |
| GB | 2346441 | 8/2000 |
| WO | WO 00/64099 | 10/2000 |

OTHER PUBLICATIONS

Jean Putz, "Digitaltechnik: Eine Einfuhrung fur Anfanger," 1978.

(Continued)

*Primary Examiner* — Ronald Abelson
(74) *Attorney, Agent, or Firm* — Kenyon & Kenyon LLP (57) ABSTRACT

In a device and a method for serial data transmission between a position-measuring device and a control unit, made up of an interface unit on the control side and an interface unit on the measuring-device side, which are connected to each other for the transmission of serial data packets with the aid of a bidirectional data channel, the interface unit on the control side includes a control-side transmitter unit for transmitting serial data packets via the data channel to a measuring-device-side receiver unit disposed in the interface unit on the measuring-device side. The interface unit on the measuring-device side includes a measuring-device-side transmitter unit for transmitting serial data packets via the data channel to a control-side receiver unit disposed in the interface unit on the control side. Data packets transmitted by the control-side transmitter unit include a clock sequence at the beginning, from whose time characteristic it is possible to derive the frequency of a control-side transmitter clock signal underlying the transmission. The receiver unit on the measuring-device side includes a measuring-device-side clock-recognition unit which evaluates the clock sequence and, in order to read in control-side output data included in the data packet, generates a measuring-device-side receiver clock signal, whose frequency corresponds to a great extent to that of the transmitter clock signal on the control side.

19 Claims, 4 Drawing Sheets

(56) References Cited

U.S. PATENT DOCUMENTS

| | | |
|---|---|---|
| 7,020,791 B1 * | 3/2006 | Aweya et al. ............ 713/400 |
| 7,130,368 B1 * | 10/2006 | Aweya et al. ............ 375/376 |
| 7,349,442 B2 | 3/2008 | Bratzdrum |
| 2002/0196884 A1 | 12/2002 | Crutchfield et al. |
| 2003/0223486 A1 | 12/2003 | Hsu |
| 2008/0117086 A1 | 5/2008 | Jansson |

OTHER PUBLICATIONS

International Search Report, PCT International Application No. PCT/EP2009/053494, dated Jul. 21, 2009.

Compaq, et al., "Universal Serial Bus Specification," Revision 2.0, pp. i, 17, 69-76, 151-153, 157, 195 (Apr. 27, 2000).

European Office Action, dated Feb. 25, 2013, issued in corresponding European Patent Application No. 09761529.8.

* cited by examiner

DEVICE AND METHOD FOR SERIAL DATA TRANSMISSION BETWEEN A POSITION-MEASURING DEVICE AND A CONTROL UNIT

FIELD OF THE INVENTION

The present invention relates to a device for serial data transmission as well as to a method for serial data transmission. Such a device and a method permit a bidirectional data transmission via a single one-channel data line.

BACKGROUND INFORMATION

Position-measuring devices which provide an absolute position value are being used increasingly in automation technology. Certain disadvantages of what are termed incremental position-measuring devices are thereby eliminated such as, for example, the necessity of carrying out a reference run after switching on in order to find a reference position which is used as reference point for the further position measuring by counting graduation marks.

Primarily serial data interfaces are used for transmitting the absolute position values, since they make do with only a few data-transmission lines, and nevertheless, have high data-transmission rates. Particularly advantageous here are what are called synchronous serial interfaces, which have one unidirectional or bidirectional data line and one clock line. Data packets are transmitted via the data line in synchronism with a clock signal on the clock line.

For example, European Published Patent Application No. 0 171 579 describes a synchronous serial data interface having a unidirectional data line and a unidirectional clock line. Position values from a position-measuring device are read out here in synchronism with a clock signal on the clock line. Among experts, this interface is known by the name "SSI."

On the other hand, European Published Patent Application No. 0 660 209 describes a synchronous serial interface having a bidirectional data line and a unidirectional clock line. In this case, it is possible to transmit data in both directions—from the sequential electronics to the position-measuring device and from the position-measuring device to the sequential electronics. The data are transmitted in synchronism with a clock signal on the clock line here, as well. This principle forms the basis for an interface of the Applicant known under the name "EnDat."

In the case of both interfaces cited, the data-transmission rate is determined by the frequency of the clock signal on the clock line, that is, a reduction in the frequency of the clock signal reduces the data-transmission rate and vice versa. In this manner, adaptation to external circumstances such as the cable length between sequential electronics and the position-measuring device is possible.

An important cost factor in the connection of position-measuring devices to sequential electronics, e.g., a machine-tool control, is based on the number of connecting lines needed, since they substantially determine the price of the high-quality data cable used. In addition, the number of connector pins necessary for the plug-in connectors is thereby determined.

SUMMARY

Example embodiments of the present invention provide a device for serial data transmission, in which the number of lines necessary for the data transmission is able to be reduced, and which continues to allow flexible data-transmission rates.

A device is provided for serial data transmission between a position-measuring device and a control unit, made up of an interface unit on the control side and an interface unit on the measuring-device side, which are connected to each other for the transmission of serial data packets with the aid of a bidirectional data channel. The interface unit on the control side includes a control-side transmitter unit for transmitting serial data packets via the data channel to a measuring-device-side receiver unit disposed in the interface unit on the measuring-device side. The interface unit on the measuring-device side includes a measuring-device-side transmitter unit for transmitting serial data packets via the data channel to a control-side receiver unit disposed in the interface unit on the control side. Data packets transmitted from the control-side transmitter unit contain a clock sequence at the beginning, from whose time characteristic it is possible to derive the frequency of a control-side transmitter clock signal underlying the transmission. The receiver unit on the measuring-device side includes a measuring-device-side clock-recognition unit which evaluates the clock sequence and, in order to read in control-side output data contained in the data packet, generates a measuring-device-side receiver clock signal, whose frequency corresponds to a great extent to that of the control-side transmitter clock signal.

Example embodiments of the present invention provide a method for serial data transmission with the aid of a device as described herein.

To that end, a method is provided for serial data transmission between a position-measuring device and a control unit with the aid of a device made up of an interface unit on the control side and an interface unit on the measuring-device side, which are connected to each other for the transmission of serial data packets with the aid of a bidirectional data channel. The interface unit on the control side includes a control-side transmitter unit for transmitting serial data packets via the data channel to a measuring-device-side receiver unit disposed in the interface unit on the measuring-device side. The interface unit on the measuring-device side includes a measuring-device-side transmitter unit for transmitting serial data packets via the data channel to a control-side receiver unit disposed in the interface unit on the control side. The method includes the follow steps:

Transmission of control-side output data with the aid of a data packet from the transmitter unit on the control side via the data channel to the receiver unit on the measuring-device side in the time clock of a control-side transmitter clock signal, the data packet including a clock sequence at the beginning, from whose time characteristic it is possible to derive the frequency of the control-side transmitter clock signal, Evaluation of the clock sequence and generation of a measuring-device-side receiver clock signal, whose frequency corresponds to a great extent to that of the control-side transmitter clock signal, in a measuring-device-side clock-recognition unit which is disposed in the receiver unit on the measuring-device side, Reading in of control-side output data, contained in the data packet, as measuring-device-side input data in the time clock of the receiver clock signal on the measuring-device side.

Further features of example embodiments of the present invention and details pertaining thereto are described in the following description with reference to the figures.

DETAILED DESCRIPTION

Figure 1:
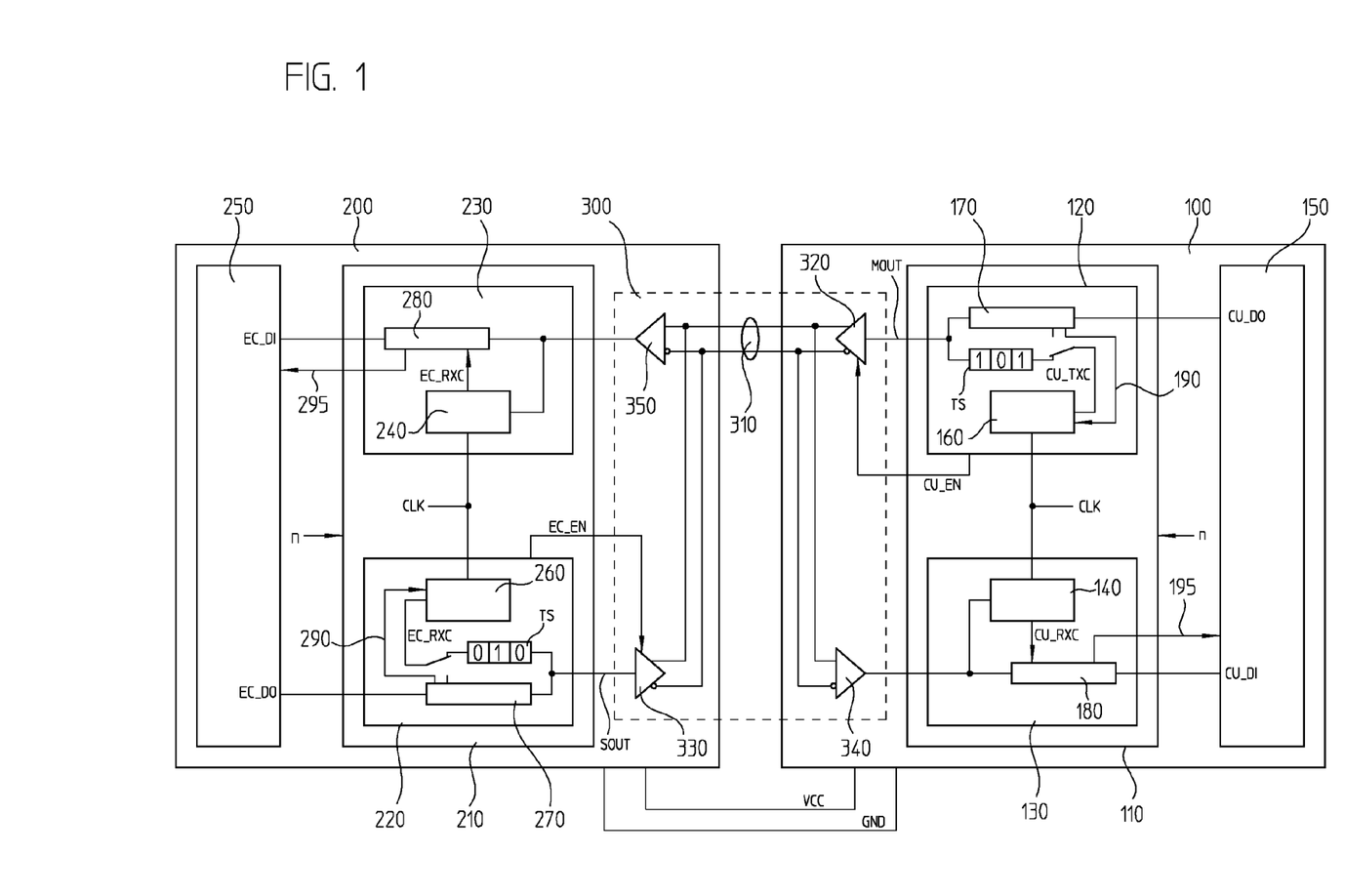
FIG. 1 shows a block diagram of a device according to an example embodiment of the present invention for serial data transmission.

FIG. 1 shows a block diagram of a device for serial data transmission between a control unit 100 and a position-measuring device 200. For the exchange of data, an interface unit 110 on the control side is disposed in control unit 100, and an interface unit 210 on the measuring-device side is disposed in position-measuring device 200, which are connected to each other via a serial, bidirectional data channel 300. In order to transmit data from control unit 100 to position-measuring device 200, a control-side transmitter unit 120 is disposed in interface unit 110 on the control side, and a measuring-device-side receiver unit 230 is disposed in interface unit 210 on the measuring-device side. Analogous thereto, data are transmitted in the reverse direction via a transmitter unit 220 on the measuring-device side and a receiver unit 130 on the control side.

The power supply may be fed to position-measuring device 200 via supply lines VCC, GND by control unit 100.

A data channel 300 is provided for the transmission of data between position-measuring device 200 and control unit 100. Data channel 300 is one-channel, that is, in the simplest case, the transmission may take place via a single line on which the logic values of the individual bits of the data packets are transmitted in the form of voltage levels relative to reference potential GND. Advantageously, however, data channel 300 is arranged differentially, i.e., the data are transmitted via a line pair 310, the signals to be transmitted being transmitted inverted relative to each other via the two lines. To that end, one differential driver unit 320, 330 and one differential receiver unit 340, 350 each are disposed on the control side and on the measuring-device side. The outputs of driver units 320, 330 and the inputs of receiver units 340, 350 are connected correspondingly to line pair 310. Differential data transmission is conventional and is not further explained.

Since the transmission of data via data channel 300 takes place in both directions over only one line pair 310, in order to avoid data collisions, only one of driver units 320, 330 may ever be switched to active. Driver units 320, 330 are activated by enable signals CU_EN, EC_EN, which are controlled by assigned transmitter units 120, 220. For example, for the transmission of data from control unit 100 to position-measuring device 200, driver unit 320 on the control side is switched to active by control-side enable signal CU_EN, and driver unit 330 on the measuring-device side is switched to passive by measuring-device-side enable signal EC_EN. Since in the case of the configuration described here, data transmission from position-measuring device 200 to control unit 100 is always initiated by control unit 100, this setting of enable signals EC_EN, CU_EN is particularly advantageous as the basic setting.

A processing unit 150 feeds control-side output data CU_DO to control-side transmitter unit 120, which forms data packets and transmits them as a serial data stream via data channel 300 to position-measuring device 200. To store control-side output data CU_DO temporarily, an output-data memory 170 is provided in control-side transmitter unit 120. The data-transmission rate, thus the speed with which the data packets are transmitted bit-by-bit, is determined by a control-side transmitter clock signal CU_TXC generated in a clock generator 160 that likewise is disposed in interface unit 110 on the control side.

In order to read in a data packet, receiver unit 230 on the measuring-device side needs a measuring-device-side receiver clock signal EC_RXC that runs synchronously with the arriving serial data stream, at least for the duration of the transmission of the data packet. In order to be able to generate it, at the beginning of the data packet, transmitter unit 120 on the control side transmits a clock sequence TS, e.g., the bit sequence 1-0-1, from whose time characteristic, measuring-device-side receiver clock signal EC_RXC is derived in a clock-recognition unit 240 disposed in receiver unit 230 on the measuring-device side. For example, this may be accomplished by measuring edge spacings of clock sequence TS.

After measuring-device-side receiver clock signal EC_RXC is available, the data contained in the data stream may be extracted and passed on as measuring-device-side input data EC_DI for further processing to a position-measuring unit 250 included in position-measuring device 200. Depending on the link of receiver unit 230 on the measuring-device side to position-measuring unit 250, input data EC_DI may be stored temporarily in an input-data memory 280 before being passed on. The presence of input data EC_DI in input-data memory 280 is then signaled to position-measuring unit 250, for example, via a signal line 295 from input-data memory 280. Alternatively, the signaling may also be performed by clock-recognition unit 240.

Data packets, which are transmitted in this manner from control unit 100 to position-measuring device 200, may include any information as desired:

Instructions, e.g., for requesting position values or memory contents ("electronic type label")

Addressing information for the specific selection of one position-measuring device 200 (necessary if a plurality of position-measuring devices 200 are connected to one control unit 100)

Control or configuration data, e.g., calibration values

For the data transmission in the opposite direction, thus, from position-measuring device 200 to control unit 100, position-measuring unit 250 feeds measuring-device-side output data EC_DO to transmitter unit 220 on the measuring-device side. An output-data memory 270 may be provided for temporary storage here, as well. For example, measuring-device-side output data EC_DO may be position data or memory contents requested by instruction of control unit 100. Transmitter unit 220 on the measuring-device side in turn forms data packets, which it transmits with a data-transmission rate that is determined by a measuring-device-side transmitter clock signal EC_TXC, in the form of a serial data stream via data channel 300 to receiver unit 130 on the control side. The beginning of the transmission, in this case synonymous with the start of measuring-device-side transmitter clock signal EC_TXC, may again be initiated via a signal line 290 by output-data memory 270 on the measuring-device side.

The data-word length of the data to be transmitted is predefined to interface units 110, 210 by parameters n that may either be set permanently, or else may be programmable. This information is needed, inter alia, for the correct control of enable signals CU_EN, EC_EN, as well. Furthermore, in each case, operating clock signals CLK are available to interface units 110, 210 for the control of internal sequences. For instance, they may be used by clock generators 160, 260 for generating transmitter clock signals CU_TXC, EC_TXC, and possibly in clock-recognition units 140, 240 for ascertaining receiver clock signals CU_RXC, EC_RXC.

In the simplest case, transmitter clock signal EC_TXC on the measuring-device side may be receiver clock signal EC_RXC on the measuring-device side. Moreover, if it can be ensured that the transmission of the data stream in the direction of control unit 100 proceeds largely in synchronism with the data stream received from control unit 100, then transmission of a clock sequence TS may possibly be omitted in this data direction, since control-side transmitter clock signal CU_TXC may be used as control-side receiver clock signal CU_RXC on the side of control unit 100 for the reception of the data stream.

However, in view of increased transmission reliability, it is particularly advantageous if data packets transmitted from position-measuring device 200 to control unit 100 likewise include a clock sequence TS, e.g., bit sequence 0-1-0, at the beginning, from which control-side receiver clock signal CU_RXC for the reception of the arriving data stream is derived in a control-side clock-recognition unit 140 disposed in receiver unit 130 on the control side. In this case, measuring-device-side transmitter clock signal EC_TXC is generated in a clock generator 260. This design approach has the further advantage that different data-transmission rates may be used in each data direction. With the aid of control-side receiver clock signal CU_RXC, receiver unit 130 on the control side extracts the data contained in the arriving serial data stream, stores it in an input-data memory 180 on the control side, and passes it on in the form of control-side input data CU_DI to processing unit 150.

Both memory modules writable in parallel and serially writable memory modules may be used as input-data memories 180, 280 and output-data memories 170, 270, respectively. Memory modules writable in parallel are also known as input or output registers. Serially writable memory modules are shift registers, for example, or special serial memories, particularly with first-in/first-out architecture.

In principle, it is possible that processing unit 150, or position-measuring unit 250, already inserts a clock sequence TS into output data CU_DO, EC_DO. However, in the case of already existing processing units 150 and position-measuring units 250, this requires a modification of the interface used to transmit output data CU_DO, EC_DO. On the other hand, if the insertion of clock sequence TS is carried out in transmitter unit 120, 220, then, if appropriate, already existing processing units 150, as well as position-measuring units 250, may continue to be used without modifications. This holds true especially if output data CU_DO, EC_DO are fed via synchronous serial interfaces, as shown below in FIG. 2.

Figure 2:
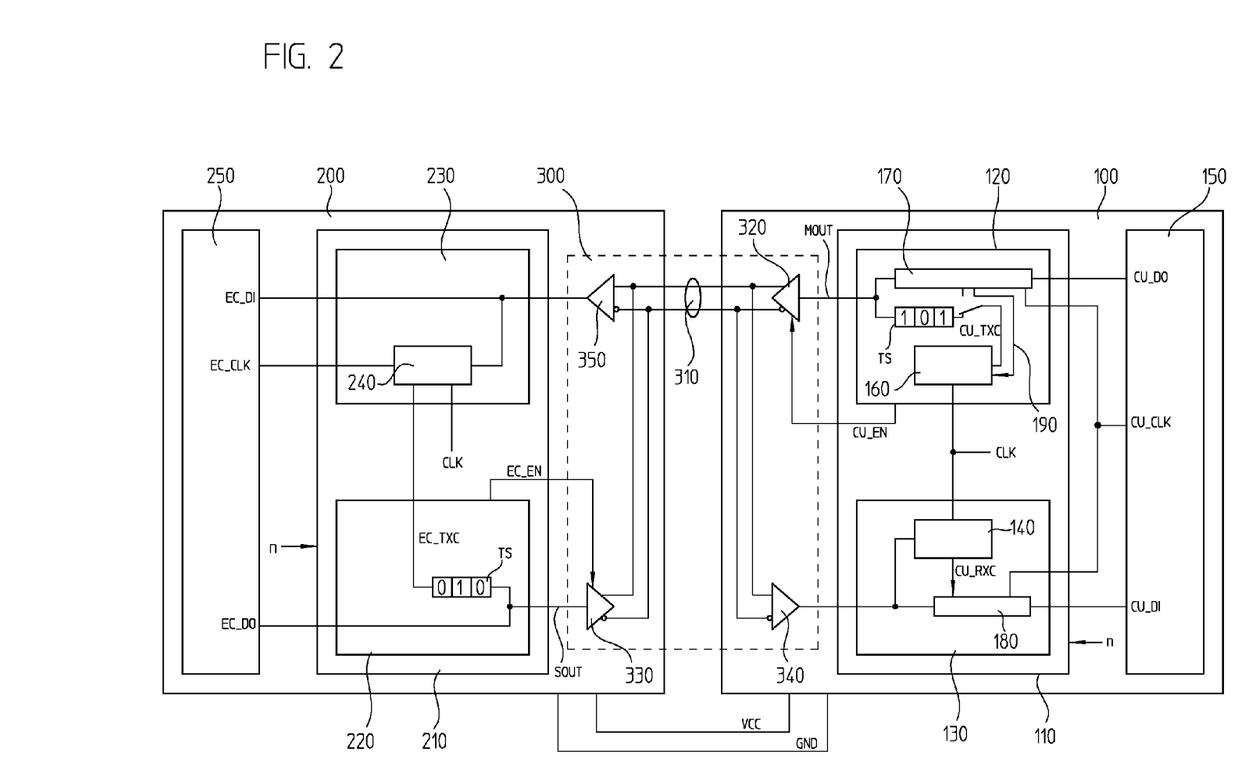
FIG. 2 shows a block diagram of a device according to an example embodiment of the present invention.

FIG. 2 shows a block diagram of a device according to an example embodiment of the present invention. In this exemplary embodiment, processing unit 150 is connected to interface unit 110 on the control side, and position-measuring unit 250 is connected to interface unit 210 on the measuring-device side, by synchronous serial interfaces.

For control unit 100, this means that control-side output data CU_DO are written by processing unit 150 into control-side output-data memory 170 serially and in synchronism with a processing clock CU_CLK. In the same manner, control-side input data CU_DI are transmitted from input-data memory 180 on the control side to processing unit 150 serially and in synchronism with processing clock CU_CLK.

Interfaces of this type are described, e.g., in European Published Patent Application No. 0 660 209, for transmitting data via a two-channel data channel with separate transmission of clock pulse and data.

Advantageously, control-side output-data memory 170 and input-data memory 180, respectively, are serial memory modules having first-in/first-out (FIFO) architecture. This means that data bits are read out from the memory in the same order in which they are written into the memory. In this manner, the writing of data into data memories 170, 180 is decoupled from the reading of data out of data memories 170, 180.

The arrival of control-side output data CU_DO is signaled to control-side clock generator 160 via a signal line 190, e.g., from control-side output-data memory 170. Thereupon, it starts control-side transmitter clock signal CU_TXC, and first of all transmits clock sequence TS, and subsequently (represented symbolically by a changeover switch) control-side output data CU_DO from the FIFO as a serial data stream to position-measuring device 200. Thus, in this case, the transmitted data packet is made up merely of clock sequence TS and control-side output data CU_DO. By using a FIFO, the data packet is transmitted still during the transfer of output data CU_DO into output-data memory 170 on the control side. The frequency of control-side transmitter clock signal CU_TXC is less than or equal to the frequency of processing clock CU_CLK. This ensures that data bits are not extracted from output-data memory 170 on the control side faster than they are fed to it.

In position-measuring device 200, measuring-device-side clock-recognition unit 240 ascertains the transmission data rate from clock sequence TS transmitted at the beginning of the arriving data stream, and generates measuring-device-side receiver clock signal EC_RXC. After clock sequence TS has been received completely, clock-recognition unit 240 switches measuring-device-side receiver clock signal EC_RXC (as measuring-device clock EC_CLK), as well as the remainder of the arriving data packet, which really corresponds to measuring-device-side input data EC_DI, through to position-measuring unit 250. It is possible to dispense with an input-data memory 280 on the measuring-device side if position-measuring unit 250 is able to process measuring-device-side input data EC_DI directly in the data-transmission speed used. If this is not the case, an input-data memory 280 (not shown) may be used on the measuring-device side, e.g., in the form of a serial FIFO, here, as well.

If data, e.g., position values or memory contents, are requested of position-measuring unit 250 with the arriving data packet, transmitter unit 120 on the control side switches control-side driver unit 320 to passive by control-side enable signal CU_EN, while transmitter unit 220 on the measuring-device side switches measuring-device-side driver unit 330 to active by measuring-device-side enable signal EC_EN. Transmitter unit 220 on the measuring-device side subsequently transmits a clock sequence TS to begin with to control unit 100, and then switches through measuring-device-side output data EC_DO directly onto data channel 300. Measuring-device-side transmitter clock signal EC_TXC is likewise generated in measuring-device-side clock-recognition unit 240, and in this exemplary embodiment, has the frequency of measuring-device clock EC_CLK, as well.

In the event the requested data are not immediately available, the data packet thus generated contains an empty area, e.g., made up of a continuous sequence of identical bits, between clock sequence TS and the data actually requested. In order to indicate the beginning of the requested data word to processing unit 150 in control unit 100, an inverse bit may be used, which brings about a change in the logic level of the incoming data stream.

In receiver unit 130 on the control side, the incoming data stream is fed to control-side clock-recognition unit 140 which, for example, by measuring edge spacings, generates from clock sequence TS a control-side receiver clock signal CU_RXC that corresponds to measuring-device-side transmitter clock signal EC_TXC. With the aid of this clock signal, the bits transmitted with the data stream are written into input-data memory 180 on the control side. The contents of input-data memory 180 on the control side are able to be read out continuously by processing unit 150 with processing clock CU_CLK, since the actual beginning of the transmission of the requested data is identified clearly by the inverse bit. In this data direction, as well, it is necessary to prevent the contents of input-data memory 180 on the control side from being read out faster than written. For this reason, the frequency of measuring-device-side transmitter clock signal EC_TXC, which determines the data-transmission rate of the incoming data stream, must be greater than or equal to processing clock CU_CLK.

In order to be able to compensate for deviations, caused by component tolerances and/or external influences (e.g., temperature fluctuations), in the frequency of clock signals CU_TXC, CU_RXC, EC_TXC, EC_RXC necessary for the data transmission, it may be provided to select for the data transmission from control unit 100 to position-measuring device 200, a lower, and for the data transmission from position-measuring device 200 to control unit 100, a higher frequency than the frequency of processing clock CU_CLK. Thus, for example, the frequency of control-side transmitter clock signal CU_TXC, and of measuring-device-side receiver clock signal EC_RXC corresponding to it, amounts to 0.75 to 0.9 times the frequency of processing clock CU_CLK, and the frequency of measuring-device-side transmitter clock signal EC_TXC and of control-side receiver clock signal CU_RXC amounts to 1.05 to 1.20 times the frequency of processing clock CU_CLK. For the example above, it follows from this that, depending on the data direction, clock-recognition unit 240 on the measuring-device side switches measuring-device-side receiver clock signal EC_RXC or measuring-device-side transmitter clock signal EC_TXC as measuring-device clock EC_CLK to position-measuring unit 250.

Figure 3:
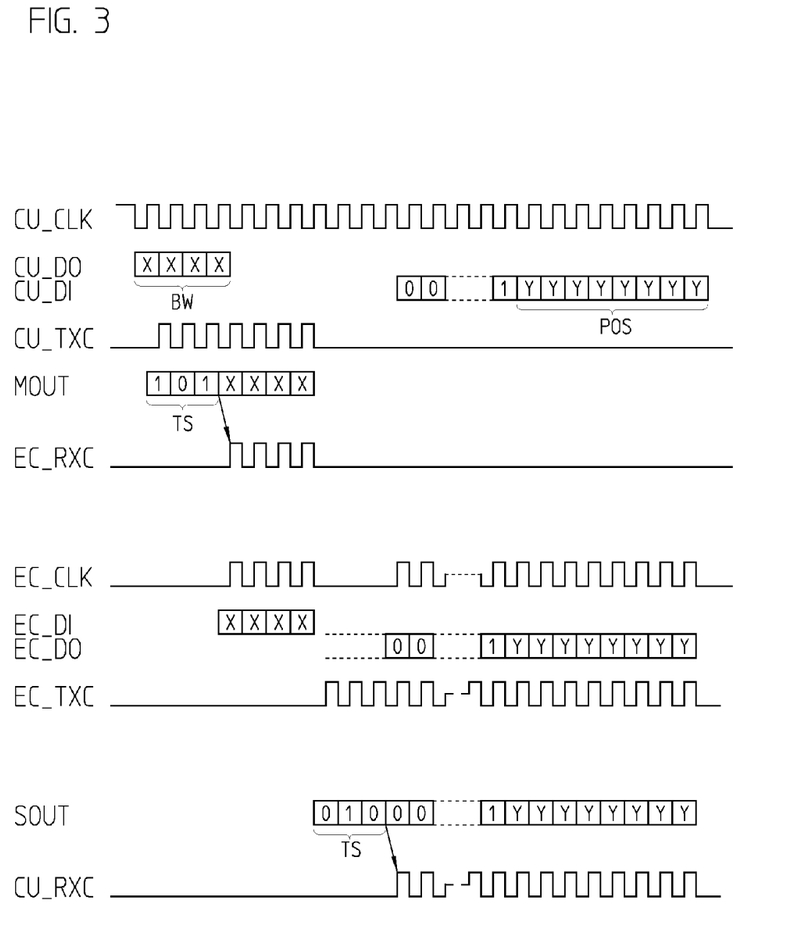
FIG. 3 shows a schematic signal-sequence diagram for the device illustrated in FIG. 2.

FIG. 3 shows a schematic signal-sequence diagram for the device illustrated in FIG. 2. Shown here is a typical communication cycle between control unit 100 and position-measuring device 200, in which first an instruction word BW, e.g., a request instruction for a position value, is transmitted from control unit 100 to the position-measuring device, whereupon the position-measuring device transmits the requested data word, e.g., position value POS, to the control unit.

The communication cycle begins with the synchronous serial transmission of control-side output data CU_DO, thus, in this case, instruction word BW, into output-data memory 170 on the control side. In this example, instruction word BW is made up of four instruction bits X. The synchronization of the transmission is accomplished with processing clock CU_CLK. Thereupon, clock generator 160 on the control side generates control-side transmitter clock signal CU_TXC, and transmitter unit 120 on the control side transmits a data packet made up of clock sequence TS, here the bit sequence 1-0-1, followed by instruction word BW as serial data stream MOUT via data channel 300 to position-measuring device 200. In simple systems in which the only instruction is a request for position data, it is also possible to dispense with instruction word BW (data-word length=0). In this special case, the transmission of clock sequence TS is already interpreted as request for position data.

In position-measuring device 200, clock-recognition unit 240 on the measuring-device side generates measuring-device-side receiver clock signal EC_RXC from clock sequence TS. Since no output-data memory 270 is provided on the measuring-device side, received instruction word BW is passed on in serial form directly to position-measuring unit 250. Measuring-device-side receiver clock signal EC_RXC, which is fed as measuring-device clock EC_CLK to position-measuring unit 250, is used for the synchronization.

Regardless of how long position-measuring unit 250 needs in order to provide the requested data, immediately after receipt of instruction word BW, transmitter unit 220 on the measuring-device side transmits a serial data stream SOUT, beginning with clock sequence TS (here, 0-1-0), followed by a constant value, in this example a logic "0", to control unit 100. The transmission takes place synchronously with measuring-device-side transmitter clock signal EC_TXC, that likewise is generated by clock-recognition unit 240 on the measuring-device side. If the requested data, e.g., ascertained position value POS, is ready, its transmission is initiated with an inverse bit, in this case, a logic "1". For reasons of clarity, position value POS here is made up of only eight position bits Y. In practice, actual position values POS are made up of 24-40 bits, for example.

From clock sequence TS transmitted with the arriving data stream, clock-recognition unit 140 on the control side generates control-side receiver clock signal CU_RXC. Receiver unit 130 on the control side uses it to write the bits following clock sequence TS into input-data memory 180 on the control side. Finally, control-side input data CU_DI (made up of constant value "0", followed by inverse bit "1" and position value POS) are transmitted in synchronism with processing clock CU_CLK to processing unit 150. The communication cycle is thus ended.

Naturally, more complex communication cycles in which more than one data word is transmitted in one data direction may also be realized using a device as described herein. In this case, it is especially advantageous if, per communication cycle, a clock sequence TS is transmitted only before the first data word transmitted in a data direction, and transmitter clock signal CU_TXC, EC_TXC or receiver clock signal EC_RXC, CU_RXC associated with it is then retained for further data words in the respective data direction.

Figure 4:
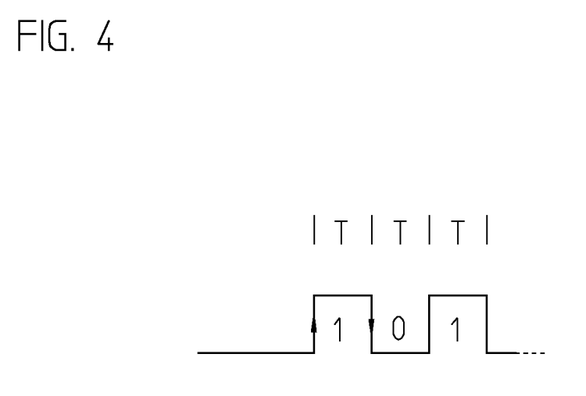
FIG. 4 shows a signal diagram of a clock sequence.

The ascertainment of receiver clock signal EC_RXC, CU_RXC from a clock sequence TS shall now be described with reference to FIGS. 4 and 5. FIG. 4 shows a signal diagram of a clock sequence TS, which here is made up of the bit sequence 1-0-1. In this example, the signal level prior to arrival of clock sequence TS corresponds to a logic "0". The period of time which one bit of clock sequence TS, and therefore also the following bits of the data stream, requires, is determined by two different successive signal edges, for example, in the case of a logic "1", by one rising signal edge followed by one falling signal edge, and corresponds to period duration T of receiver clock signal EC_RXC, CU_RXC to be ascertained.

Figure 5:
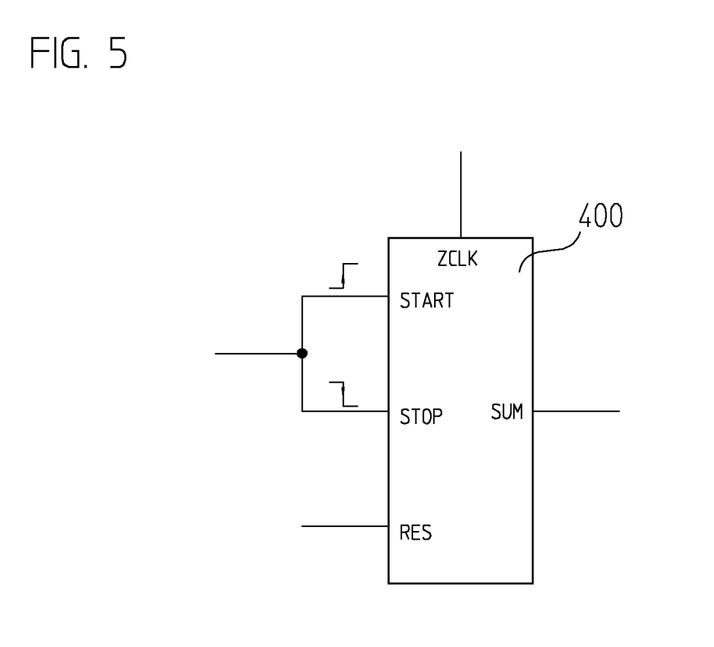
FIG. 5 shows a counter for evaluating the clock sequence.

As FIG. 5 shows, in order to measure period duration T, a counter 400 may be used, with which the period of time between two signal edges is measurable. Thus, in order to measure period duration T in the case of a logic "1", counter 400 is started with a rising signal edge and stopped again with a falling signal edge. Between the signal edges, counter 400 counts with the frequency of a counting pulse ZCLK. For example, respective operating clock CLK may be used as counting pulse ZCLK. After the measurement has been performed, counter value SUM is output, and counter 400 may be reset again via a reset signal RES for the next measurement. Period duration T may now be calculated with the aid of counter value SUM and counting pulse ZCLK.

In this context, the frequency of counting pulse ZCLK is to be selected such that the error resulting from the quantization is so small that each bit transmitted in the corresponding data direction in one communication cycle may be reliably sampled and recorded. For the transmission of data packets having up to 140 bits, it may be provided to select 6 to 8 times the highest frequency to be expected as counting frequency ZCLK for ascertaining receiver clock signal EC_RXC, CU_RXC.

Different, especially longer bit sequences may, of course, also be used as clock sequence TS, from whose edge spacings it is possible to derive receiver clock signal EC_RXC, CU_RXC to be ascertained. Likewise, a plurality of counters 400 may also be used in order to evaluate different edge spacings of the clock sequence, and thus to design the ascertainment of receiver clock signal EC_RXC, CU_RXC to be redundant, or to permit averaging.

Since interface units 110, 210 are purely digital circuits, they are particularly well suited for implementation in programmable logic modules (e.g., FPGA) or application-specific integrated circuits (ASICs). Moreover, there is the possibility of using microcontrollers for their implementation.

What is claimed is:

1. A device for serial data transmission between a control unit and a position-measuring device, comprising
    an interface unit on a control side and an interface unit on a measuring-device side, the interface units being connected to each other for transmission of serial data packets by a bidirectional data channel;
    a control-side transmitter unit, arranged in the interface unit on the control side, adapted to transmit serial data packets via the data channel to a measuring-device-side receiver unit arranged in the interface unit on the measuring-device side;
    a measuring-device-side transmitter unit, arranged in the interface unit on the measuring-device side, adapted to transmit serial data packets by the data channel to a control-side receiver unit arranged in the interface unit on the control side;
    wherein the control-side transmitter unit is adapted to transmit data packets that include a clock sequence at a beginning, a frequency of a control-side transmitter clock signal underlying the transmission being derivable from a time characteristic of the clock sequence; and
    wherein the receiver unit on the measuring-device side includes a measuring-device-side clock-recognition unit adapted to evaluate the clock sequence and, in order to read in control-side output data included in the data packet, to generate a measuring-device-side receiver clock signal having a frequency that substantially corresponds to the frequency of the control-side transmitter clock signal.

2. The device according to claim 1, wherein the clock-recognition unit on the measuring-device side is adapted to feed the measuring-device-side receiver clock signal as a measuring-device-side transmitter clock signal to the transmitter unit on the measuring-device side.

3. The device according to claim 1, wherein the transmitter unit on the measuring-device side is adapted to transmit data packets including a clock sequence at a beginning, a frequency of a measuring-device-side transmitter clock signal underlying the transmission being derivable from a time characteristic of the clock sequence; and
    wherein the receiver unit on the control side includes a control-side clock-recognition unit adapted to evaluate the clock sequence and, in order to read in measuring-device-side output data included in the data packet, to generate a control-side receiver clock signal having a frequency that substantially corresponds to the frequency of the measuring-device-side transmitter clock signal.

4. The device according to claim 1, wherein the control unit includes a processing unit adapted to feed control-side output data to be transmitted to the control-side transmitter unit, the device further comprising a synchronous serial interface adapted to transmit control-side input data received from the control-side receiver unit to the processing unit.

5. The device according to claim 1, wherein at least one of (a) the transmitter unit on the control side includes a control-side output-data memory adapted to store control-side output data to be transmitted and (b) the receiver unit on the control side includes a control-side input-data memory adapted to store received control-side input data.

6. The device according to claim 5, wherein at least one of (a) the output-data memory on the control side and (b) the input-data memory on the control side includes a serial memory having first-in/first-out architecture.

7. The device according to claim 1, wherein the position-measuring device includes a position-measuring unit, the receiver unit on the measuring-device side adapted to transmit received measuring-device-side input data to the position-measuring unit, the position-measuring unit adapted to feed measuring-device-side output data to be transmitted to the transmitter unit on the measuring-device side by a synchronous serial interface.

8. The device according to claim 1, wherein at least one of (a) the transmitter unit on the measuring-device side includes a measuring-device-side output-data memory adapted to store measuring-device-side output data to be transmitted and (b) the receiver unit on the measuring-device side includes a measuring-device-side input-data memory adapted to store received measuring-device-side input data.

9. The device according to claim 8, wherein at least one of (a) the output-data memory on the measuring-device side and (b) the input-data memory on the measuring-device side includes a serial memory having first-in/first-out architecture.

10. A method for serial data transmission between a position-measuring device and a control unit, including a device having: an interface unit on a control side and an interface unit on a measuring-device side, the control units connected to each other for transmission of serial data packets by a bidirectional data channel; a control-side transmitter unit, arranged in the interface unit on the control side, adapted to transmit serial data packets by the data channel to a measuring-device-side receiver unit arranged in the interface unit on the measuring-device side; and a measuring-device-side transmitter unit, arranged in the interface unit on the measuring-device side, adapted to transmit serial data packets by the data channel to a control-side receiver unit arranged in the interface unit on the control side, comprising:
    transmitting control-side output data by a data packet by the transmitter unit on the control side via the data channel to the receiver unit on the measuring-device side in accordance with a time clock of a control-side transmitter clock signal, the data packet including a clock sequence at a beginning, a frequency of the control-side transmitter clock signal derivable from a time characteristic of the clock sequence;
    evaluating the clock sequence and generating a measuring-device-side receiver clock signal having a frequency that substantially corresponds to the frequency of the control-side transmitter clock signal, in a measuring-device-side clock-recognition unit arranged in the receiver unit on the measuring-device side;

reading in of control-side output data, included in the data packet, as measuring-device-side input data in the time clock of the receiver clock signal on the measuring-device side.

11. The method according to claim 10, wherein the data packet, including the clock sequence and the control-side output data fed to the transmitter unit on the control side by a processing unit included in the control unit, is formed in the control-side transmitter unit.

12. The method according to claim 10, further comprising transmitting the measuring-device-side input data to a position-measuring unit arranged in the position-measuring device.

13. The method according to claim 12, further comprising feeding data, by the position-measuring unit, requested by an instruction included in the measuring-device-side input data, as measuring-device-side output data to the transmitter unit on the measuring-device side.

14. The method according to claim 13, further comprising:
transmitting the measuring-device-side output data by a data packet by the transmitter unit on the measuring-device side via the data channel to the receiver unit on the control side in a time clock of a measuring-device-side transmitter clock signal, the data packet including a clock sequence at a beginning, a frequency of the measuring-device-side transmitter clock signal derivable from a time characteristic of the clock sequence;
evaluating the clock sequence and generating a control-side receiver clock signal having a frequency that substantially corresponds to a frequency of the measuring-device-side transmitter clock signal, in a control-side clock-recognition unit arranged in the receiver unit on the control side; and
reading in of the measuring-device-side output data, included in the data packet, as control-side input data in the time clock of the receiver clock signal on the control side.

15. The method according to claim 14, wherein the data packet is formed in the transmitter unit on the measuring-device side from the clock sequence and the measuring-device-side output data.

16. The method according to claim 14, further comprising transmitting the control-side input data to a processing unit included in the control unit.

17. The method according to claim 10, further comprising at least one of (a) temporarily storing the control-side output data in a control-side output-data memory arranged in the transmitter unit on the control side and (b) temporarily storing the control-side input data in a control-side input-data memory arranged in the receiver unit on the control side.

18. The method according to claim 10, further comprising at least one of (a) temporarily storing the measuring-device-side input data in a measuring-device-side input-data memory arranged in the receiver unit on the measuring-device side and (b) temporarily storing the measuring-device-side output data in a measuring-device-side output-data memory arranged in the transmitter unit on the measuring-device side.

19. The method according to claim 10, further comprising evaluating the clock sequence by measuring edge spacings.

* * * * *